June 21, 1960   H. B. KONING ET AL   2,941,600
HELICOPTER PROPULSION SYSTEM
Filed July 20, 1956
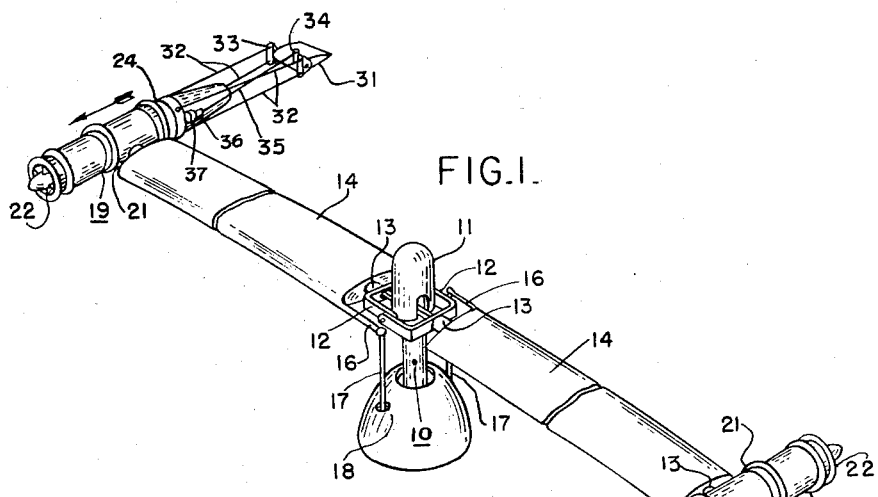
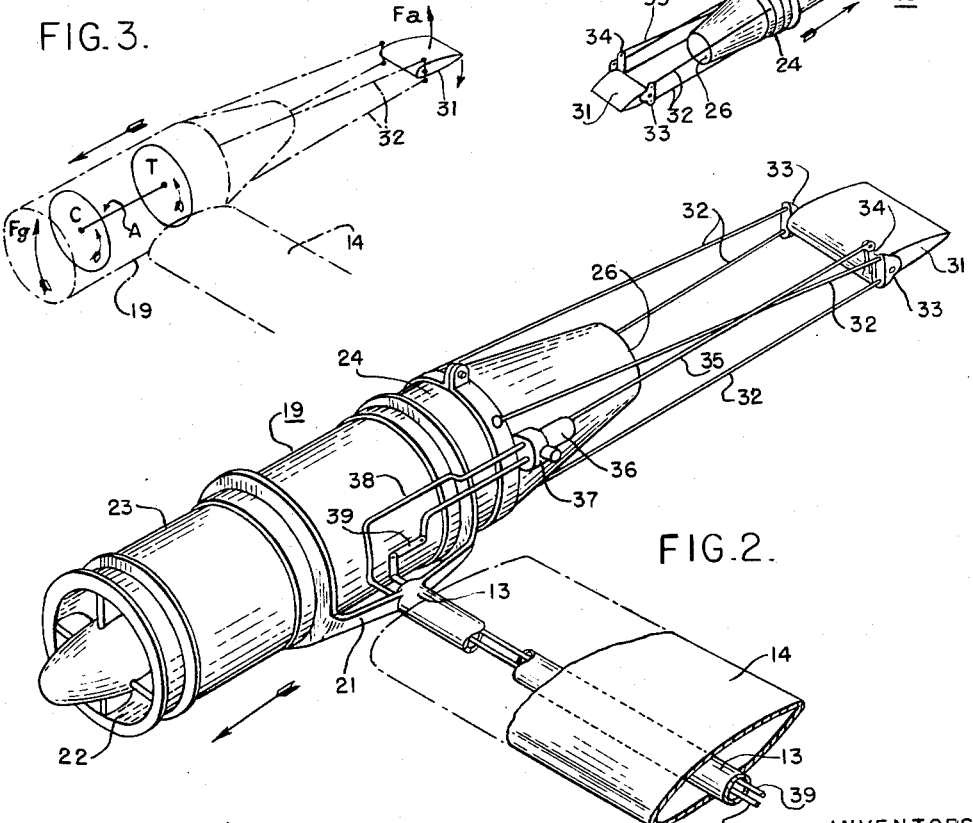
INVENTORS.
HENDRIK B. KONING
WILLEM K. VERMET
BY William J Foley
ATTORNEY

United States Patent Office 2,941,600
Patented June 21, 1960

2,941,600

HELICOPTER PROPULSION SYSTEM

Hendrik B. Koning, Narberth, Pa., and Willem K. Vermet, Kansas City, Mo., assignors to Westinghouse Electric Corporation, East Pittsburgh, Pa., a corporation of Pennsylvania Filed July 20, 1956, Ser. No. 599,086

4 Claims. (Cl. 170—135.4)

This invention relates to an improved propulsion system for aircraft and more particularly to a propulsion system for aircraft of the direct lift type, commonly called helicopters.

It has previously been proposed that the rotor blades of a helicopter be propelled by propulsion units, such as jet engines, mounted at the tips of the rotor blades. While desirable from the standpoint of eliminating the difficulties of torque interaction between the rotor and fuselage associated with fuselage mounted power plants, mounting the propulsion units on the rotor presents other problems which heretofore have limited the usefulness of this arrangement.

One of the most serious problems associated with rotor tip mounted propulsion units employing rotating masses or elements stems from the gyroscopic reaction forces imposed on such units. It is well known that a rapidly rotating mass, such as the turbine-compressor combination of a turbo-jet engine, or the propeller of a reciprocating engine-driven propulsion unit tends to resist inclination of its axis of rotation. Any force applied to such a rotating mass which tends to change the attitude of the mass by altering its axis of rotation in space induces a gyroscopic reaction force which acts in the same direction as the applied force but displaced 90° in azimuth therefrom in the direction of rotation of the mass. Thus, a tip mounted propulsion unit orbiting in a helicopter sustaining system about a vertical axis and having portions thereof rotating about a substantially horizontal axis will be subjected to gyroscopic reaction forces tending to tilt the axis of the rotating portions in a vertical plane. These reaction forces impose considerable stress on the propulsion unit mounting system and undesirably complicate this structure. Furthermore, in the case of propulsion units which are mounted directly on the rotor blades of the sustaining system, the gyroscopic reaction forces are transmitted directly to the rotor blades and tend to twist and warp the blades, upsetting the aerodynamic stability of the system.

This invention envisions means for counteracting the gyroscopic reaction forces by applying to the propulsion unit forces which are equal but opposite to the reaction forces.

The forces necessary to counteract the gyroscopic reaction forces are produced by an aerodynamic lift element, commonly called an airfoil, which orbits within the sustaining system together with the rotor blades and propulsion unit, and produces lift forces which are transmitted to the propulsion unit. For a jet type propulsion unit, the airfoil is preferably located within the stream of hot gases issuing from the unit to render the airfoil more effective and enable its size to be held to a minimum.

Since the magnitude of gyroscopic reaction forces varies with the speed of rotation of the inertia mass, this invention also contemplates means for varying the counter forces produced by the airfoil when the speed of rotation of the propulsion unit elements is changed.

The principal object, then, of this invention is to provide an improved propulsion arrangement for the main lifting rotor of a helicopter sustaining system.

A more specific object of the invention is the counteraction of gyroscopic reaction forces acting on a rotor tip mounted propulsion unit for a helicopter sustaining system.

Another object of the invention is to provide means for applying to a rotor tip mounted propulsion unit forces tending to counteract gyroscopic reaction forces acting on said unit.

It is a further object of this invention to produce the counter forces by means of an aerodynamic lift element carried by the helicopter sustaining system.

A still further object of the invention is to vary the counter forces as the gyroscopic reaction forces vary with changes in speed of the rotating inertia elements of the propulsion unit.

These and other objects are effected by the invention as will be apparent from the following description and claims taken in connection with the accompanying drawings, forming a part of this application, in which:

Fig. 1 is a perspective view of a helicopter rotor embodying this invention and from which sections of the rotor blades have been omitted to clarify the illustration;

Fig. 2 is a perspective view showing one of the propulsion units for the rotor on an enlarged scale; and Fig. 3 is a diagram illustrating the forces acting on the propulsion unit.

Referring to Fig. 1 of the drawings, the helicopter sustaining system is illustrated as a dual blade rotor having a generally vertical mast 10 which carries at its upper end a hub 11 to which are pivotally secured a pair of flapping links 12. Each flapping link is securely connected to a tubular spar 13 extending radially outwardly with respect to the mast 10. The spars 13 constitute stiffening members and supports for the rotor blades 14 which encompass substantially the entire axial extent of the spars. The pivotal connection between the flapping links 12 and the mast hub 11 has a substantially horizontal axis such as to permit flapping motion of the spars 13 and the blades 14 carried thereby, but prevent rotation of the spars 13 about their longitudinal axes. In order for the rotor system to be controllable by a pilot, provision is made for tilting each rotor blade 14 about a longitudinal axis to change its pitch. The required freedom of movement of the rotor blades 14 is provided by bearing connections (not shown) between the blades and the spars 13 which enable the blades to tilt on the spars. The root of each rotor blade 14 carries a control horn 16 to which is attached a control link 17 which extends downwardly alongside of the rotor mast 10 to suitable pilot-manipulated control means within a housing 18.

The pilot actuated means for effecting pitch changes of the rotor blades 14 forms no part of the present invention and no detail description of this mechanism will be given here. A number of control systems suitable for use with the above-described rotor system are well known and well understood by those skilled in the art of vertical lift aircraft.

The rotor system embodying this invention is propelled, i.e., the rotor blades 14 are rotated in a substantially horizontal plane about the axis of mast 10, by propulsion units 19 mounted at the tip of each rotor blade 14. Referring to Fig. 2 of the drawings, it will be noted that in this, the preferred embodiment of the invention, each propulsion unit 19 is supported at the end of a spar 13 by a yoke member 21 securely affixed to the spar and encompassing a body portion of the propulsion unit.

The propulsion units 19 illustrated are of a class of motive fluid apparatus commonly termed "turbo-jet engines." In operation, these engines take in a motive fluid, air in this instance, through a frontal intake 22, compress the fluid in a compressor positioned in a forward section 23 of the unit, mix and burn fuel with the compressed fluid to heat and expand the fluid which is then directed through a turbine, usually located in a rearward section 24 of the engine and which extracts power to drive the compressor, and out through an exhaust nozzle 26 at the rear of the engine. The mass of hot gases issuing from the engine exhaust nozzle 26 provides a propulsive thrust to drive the engine forward.

The compressor and turbine of a turbo-jet engine are rotating elements which, when rotating at high speeds, constitute inertia masses subject to gyroscopic forces. A diagrammatic illustration of this type propulsion unit appears as Fig. 3 of the drawings and illustrates the manner in which gyroscopic forces act on the unit when mounted on the tip of a helicopter rotor blade. The rotating mass constituting the compressor is indicated at C and the rotating mass constituting the turbine is indicated at T. These elements are normally connected by a rotating shaft, the axis of rotation of which is indicated at A. The arrows on these elements indicate their direction of rotation to be counterclockwise as viewed from the front of the engine. Consider now that the rotor system is in operation with the propulsion units orbiting about the axis of rotor mast 10 in a counterclockwise direction as viewed from above (the direction of movement is indicated in the several figures by arrows lying in a horizontal plane). The attitude in space of the axis of rotation A of the inertia masses C and T is constantly changing as the propulsion unit moves about the mast 10. This change in attitude of axis A is the same as would be produced by a force couple acting in a horizontal plane against the inertia masses C and T and tending to swing their axis A counterclockwise (as viewed from above) in a horizontal plane. This swinging of the axis of rotation A produces a gyroscopic reaction force $F_g$ acting as a couple tending to tilt the forward end of the engine upwardly in a vertical plane. The gyroscopic reaction force acts in a plane at right angles to the plane in which the axis of the rotating elements is being moved because of the 90 degree gyroscopic lag between the azimuthal position of a force imposed against a rotating inertia mass and the azimuthal position of the resulting response.

This gyroscopic reaction force acting on the propulsion unit 19 would, if not counteracted at the propulsion unit, be transmitted to the rotor spar 13 and impose prohibitive twisting loads thereon and on the motor hub structure as well.

This invention contemplates counteracting gyroscopic reaction forces by means of lift or force-producing aerodynamic elements carried by the rotor system. Preferably, the aerodynamic element is an airfoil member 31 positioned directly behind each propulsion unit 19 within the stream of propulsive fluid issuing therefrom. The high velocity fluid issuing from the propulsion unit 19 renders the airfoil more effective than it would be if mounted elsewhere within the sustaining system and subjected to a comparatively lower velocity fluid flow, and enables a small airfoil to be employed. Each airfoil is carried by a number of rod-like longerons 32 attached at their forward ends to the rear body portion 24 of a propulsion unit 19 and at their rear ends to a pair of bearing members 33 in which the airfoil is journalled. With the propulsion unit mounting arrangement shown and in which the principal gyroscopic reaction forces are acting in a vertical plane, the airfoils 31 are mounted for tilting movement about horizontal axes. When so disposed, an increase in the angle of attack of an airfoil 31, i.e., a downward movement of the trailing edge of the airfoil, produces a lifting force ($F_a$ in Fig. 3) which is transmitted to its propulsion unit 19 by the longerons 32, tending to tilt the propulsion unit in a vertical plane in a direction opposite the direction in which the gyroscopic reaction force $F_g$ tends to tilt the propulsion unit.

In order to effectively nullify or counteract the gyroscopic reaction forces acting on each propulsion unit 19, the tilting moment applied to the propulsion unit by its airfoil 31 must be varied in accordance with changes in magnitude of the gyroscopic reaction froces. In the preferred embodiment of this invention, the angle of attack of the airfoil 31 is varied in accordance with changes of the airfoil 31 is varied in accordance with changes in the rotational speed of the inertia masses associated with the propulsion unit. The magnitude of the gyroscopic reaction force $F_g$ is determined by the angular velocity of the rotating elements within the propulsion unit and by the rate of angular displacement of the axis of rotation of these elements. In most helicopter rotor systems provision is made for maintaining the velocity of the rotor blades within certain limits. Since the velocity of the rotor changes but slightly, variations in the rate of displacement of the axis of rotation of the rotating elements are small and may be disregarded insofar as they affect changes in the gyroscopic reaction force. This leaves changes in rotative speed of the propulsion unit inertia masses as the principal factor influencing variation in the gyroscopic reaction force. By changing the angle of attack of the airfoil 31 simultaneously with changes in the rotative speed of the propulsion unit compressor and turbine, the lift force $F_a$ produced by the airfoil can be made to balance or counteract the gyroscopic reaction force acting on the propulsion unit.

Fig. 2 of the drawings illustrates a mechanism for effecting changes in the angle of attack of one of the airfoils 31 as changes are made in the rotative speed of components of its propulsion unit. The airfoil 31 carries at its leading edge a control horn 34 which is actuated by a control link 35 driven by a power element 36 on the propulsion unit 19. Control of the power element 36 is, in turn, effected by the propulsion unit fuel control 37 which governs the rate at which fluid is supplied to the propulsion unit 19 from a fuel line 38. The fuel control 37 is manipulated by the pilot through a linkage system indicated generally by the numeral 39. Both the fuel line 38 and the fuel control linkage 39 extend from the fuselage of the helicopter (not shown) up through the rotor mast 10 and out through the hollow rotor spars 13 to the propulsion unit 19.

The arrangement is such that manipulation of the fuel control 37 to admit additional fuel to the propulsion unit 19 also energizes power element 36 to increase the angle of attack of the airfoil 31. Conversely, decreasing the rate of fuel flow decreases the angle of attack of the airfoil 31. In this manner, the lift producing capability of the airfoil 31 is altered in proportion to the principal factor affecting the gyroscopic reaction forces, namely, changes in speed of the rotating inertia masses within the propulsion unit.

The important consideration so far as controlling the angle of attack of the airfoil 31 is concerned, is that some means be provided for relating the position of the airfoil to the magnitude of the gyroscopic reaction forces acting on the propulsion unit. For illustrative purposes, a control has been described which relates these two functions through the fuel control for the propulsion unit. It can be appreciated, however, that other control systems can be employed to position the airfoil 31. For example, one other such control might be responsive directly to the speed of rotation of the propulsion unit inertia elements rather than through the fuel control. Another control might detect twisting stresses within the rotor spar 13 and alter the angle of attack of airfoil 31 in such a manner as to keep these stresses within a certain maximum range. Other control arrangements falling within the scope of this invention will be apparent to those skilled in the art.

While the invention has been shown in but one form, it will be obvious to those skilled in the art that it is not

What is claimed is:

1. A helicopter sustaining system comprising a plurality of rotor blades, a propulsion unit mounted at the tip of at least one of said blades, said propulsion unit including rotating masses which are subject to gyroscopic reaction forces tending to alter the attitude of said propulsion unit as it orbits about the axis of rotation of the sustaining system, and means for counteracting the gyroscopic forces of said propulsion unit, said means including an aerodynamic element mounted for orbital movement in said sustaining system and associated with said propulsion unit, said element being adapted to produce forces in opposition to the gyroscopic forces acting on the propulsion unit, means for transmitting said opposition forces to said propulsion unit, and means for varying the angle of attack of said aerodynamic element in accordance with changes in the rotational speed of said rotating masses of said propulsion unit.

2. A helicopter sustaining system comprising a plurality of rotor blades, a propulsion unit mounted at the tip of at least one of said blades, said propulsion unit including rotating masses whilch are subject to gyroscopic reaction forces tending to alter the attitude of said propulsion unit as it orbits about the axis of rotation of the sustaining system, and means for counteracting said gyroscopic forces, said means including an airfoil member mounted on said propulsion unit, said airfoil member being adapted to produce forces in opposition to the gyroscopic forces acting on said propulsion unit, and means for varying the angle of attack of said airfoil member in accordance with changes in the gyroscopic forces of said propulsion unit.

3. A helicopter sustaining system comprising a plurality of rotor blades, a propulsion unit mounted at the tip of at least one of said blades, means for supplying fuel to said propulsion unit, said propulsion unit having rotating masses which are subject to gyroscopic reaction forces tending to alter the attitude of said propulsion unit as it orbits about the axis of rotation of said sustaining system, the rotative speed of said propulsion unit masses being proportional to the rate of fuel flow into said propulsion unit, and means for counteracting said gyroscopic forces, said means including an aerodynamic element mounted for orbital movement within said sustaining system, said element being adapted to produce forces in opposition to the gyroscopic forces acting on the propulsion unit, means for transmitting said opposition forces to said propulsion unit, and means for varying the angle of attack of said aerodynamic element in accordance with changes in the rate of fuel flow into said propulsion unit whereby the force produced by said aerodynamic element is proportional to the rotative speed of the rotating masses in said propulsion unit.

4. A helicopter sustaining system comprising a plurality of rotor blades, a turbo-jet engine mounted at the tip of at least one of said blades for propelling said rotor blades, means for supplying fuel to said engine, said engine having rotating elements which are subject to gyroscopic reaction forces tending to alter the attitude of said engine as it orbits about the axis of rotation of said sustaining system, the rotative speed of said engine elements being proportional to the rate of fuel flow into said engine, and means for counteracting said gyroscopic forces, said means including an airfoil member mounted on said engine within the stream of propulsive fluid issuing from said engine, said airfoil member being inclinable with respect to the stream of propulsive fluid whereby said airfoil member produces a force in opposition to the gyroscopic forces acting on said engine, and means for positioning said airfoil member in accordance with the rate of fuel flow into said engine whereby said airfoil member produces a force proportional to the rotational speed of the rotating elements of said engine.

References Cited in the file of this patent

UNITED STATES PATENTS

| 1,817,074 | Glessner | Aug. 4, 1931 |
| 1,909,450 | Bleecker | May 16, 1933 |
| 2,082,674 | Young | June 1, 1937 |
| 2,474,359 | Isacco | June 28, 1949 |

FOREIGN PATENTS

| 581,217 | Great Britain | Oct. 4, 1946 |